(12) United States Patent
Cha et al.

(10) Patent No.: US 12,279,057 B2
(45) Date of Patent: Apr. 15, 2025

(54) IMAGE SENSING SYSTEM THAT MEASURES DEPTH INFORMATION WHILE GENERATING AN OPTIMIZED COLOR IMAGE AND MONOCHROME IMAGE

(71) Applicant: SK hynix Inc., Gyeonggi-do (KR)

(72) Inventors: Su Ram Cha, Gyeonggi-do (KR); Ji Hee Han, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 275 days.

(21) Appl. No.: 17/973,989

(22) Filed: Oct. 26, 2022

(65) Prior Publication Data
US 2023/0300484 A1 Sep. 21, 2023

(30) Foreign Application Priority Data
Mar. 17, 2022 (KR) .................. 10-2022-0033364

(51) Int. Cl.
*H04N 25/705* (2023.01)
*H04N 23/84* (2023.01)
*H04N 25/13* (2023.01)

(52) U.S. Cl.
CPC ......... *H04N 25/705* (2023.01); *H04N 23/843* (2023.01); *H04N 25/135* (2023.01)

(58) Field of Classification Search
CPC .. H04N 25/705; H04N 23/843; H04N 25/135; H04N 25/75; H01L 27/14621; H01L 27/14605
See application file for complete search history.

(56) References Cited

U.S. PATENT DOCUMENTS

| | | | |
|---|---|---|---|
| 3,971,065 A | 7/1976 | Bayer | |
| 6,989,862 B2 * | 1/2006 | Baharav | G06T 3/4015 348/273 |
| 9,692,992 B2 | 6/2017 | Wu | |
| 10,855,959 B2 | 12/2020 | Cha et al. | |
| 2010/0254602 A1 * | 10/2010 | Yoshino | H04N 25/134 382/167 |
| 2012/0218426 A1 * | 8/2012 | Kaizu | H04N 25/75 348/241 |
| 2014/0253808 A1 | 9/2014 | Tachi | |
| 2017/0109865 A1 * | 4/2017 | Kim | G06T 3/4069 |

FOREIGN PATENT DOCUMENTS

KR 10-2021-0042086 A 4/2021

* cited by examiner

*Primary Examiner* — Mekonnen D Dagnew
(74) *Attorney, Agent, or Firm* — IP & T GROUP LLP

(57) ABSTRACT

Disclosed is an image sensing system including a first sub-pixel array having an arrangement of K×K pixels, where "K" is a natural number greater than 4, wherein the first sub-pixel array includes: first pixels disposed in a first diagonal direction and each having a green filter; second pixels disposed in a second diagonal direction that intersects the first diagonal direction and each having a red filter, and third pixels disposed in the second diagonal direction and each having a blue filter; and fourth pixels each having a white filter and disposed at the other positions except for arrangement positions of the first to third pixels disposed in the first and second diagonal directions, and fifth pixels suitable for measuring depth information, and the fourth pixels and the fifth pixels are disposed in a first pattern.

19 Claims, 11 Drawing Sheets

FIG. 3

[Bayer Pattern]

| R | G | R | G |
|---|---|---|---|
| G | B | G | B |
| R | G | R | G |
| G | B | G | B |

[NP1]

| R | W | W | G |
|---|---|---|---|
| PD | R | G | W |
| PD | G | B | W |
| G | PD | PD | B |

[NP2]

| R | PD | PD | G |
|---|---|---|---|
| W | R | G | PD |
| W | G | B | PD |
| G | W | W | B |

[NP3]

| R | W | W | G |
|---|---|---|---|
| W | R | G | W |
| W | G | B | W |
| G | W | W | B |

| G | R | G | R |
|---|---|---|---|
| B | G | B | G |
| G | R | G | R |
| B | G | B | G |

[Bayer Pattern]

| G | PD | PD | R |
|---|----|----|---|
| W | G  | R  | W |
| W | B  | G  | W |
| B | W  | W  | G |

[NP4]

| G | W  | W  | R |
|---|----|----|---|
| W | G  | R  | W |
| W | B  | G  | W |
| B | PD | PD | G |

| G | W | W | B | G | W | W | B |
|---|---|---|---|---|---|---|---|
| W | G | B | W | W | G | B | W |
| W | R | G | PD | PD | R | G | W |
| R | W | PD | G | R | W | W | G |
| G | W | PD | B | G | W | W | B |
| W | G | B | W | W | G | B | W |

FIG. 10

| G | W | W | B | G | W |
|---|---|---|---|---|---|
| W | G | B | W | W | G |
| W | R | G | PD | PD | R |
| R | W | PD | G | R | W |
| G | W | PD | B | G | W |
| W | G | B | W | W | G |
| W | R | G | W | W | R |
| R | W | W | G | R | W |

FIG. 11

| PD | R | G | W | W | R | G | PD |
|----|---|---|---|---|---|---|----|
| R | W | W | G | R | W | W | G |
| G | W | W | B | G | W | W | B |
| W | G | B | PD | PD | G | B | W |
| W | R | G | PD | PD | R | G | W |
| R | W | W | G | R | W | W | G |
| G | W | W | B | G | W | W | B |
| PD | G | B | W | W | G | B | PD |

IMAGE SENSING SYSTEM THAT MEASURES DEPTH INFORMATION WHILE GENERATING AN OPTIMIZED COLOR IMAGE AND MONOCHROME IMAGE

CROSS-REFERENCE TO RELATED APPLICATION(S)

This application claims priority under 35 U.S.C. § 119 to Korean Patent Application No. 10-2022-0033364, filed on Mar. 17, 2022, the disclosure of which is incorporated herein by reference in its entirety.

BACKGROUND

1. Field

Various embodiments of the present disclosure relate to a semiconductor design technique, and more particularly, to an image sensing system.

2. Description of the Related Art

Image sensors are sensors for capturing images using the property of a semiconductor which reacts to light. Image sensors may be roughly classified into charge-coupled device (CCD) image sensors and complementary metal-oxide semiconductor (CMOS) image sensors. Recently, CMOS image sensors are widely used because the CMOS image sensors can allow both analog and digital control circuits to be directly implemented on a single integrated circuit (IC).

SUMMARY

Various embodiments of the present disclosure are directed to an image sensing system that may measure depth information while generating an optimized color image and monochrome image.

In accordance with an embodiment of the present disclosure, an image sensing system may include: a first sub-pixel array having an arrangement of K×K pixels, where "K" is a natural number greater than 4, wherein the first sub-pixel array may include: first pixels disposed in a first diagonal direction and each having a green filter; second pixels disposed in a second diagonal direction that intersects the first diagonal direction and each having a red filter; third pixels disposed in the second diagonal direction and each having a blue filter; fourth pixels each having a white filter and disposed at the other positions except for the arrangement positions of the first to third pixels disposed in the first and second diagonal directions; and fifth pixels suitable for measuring depth information and disposed at the other positions except for the arrangement positions of the first to third pixels disposed in the first and second diagonal directions, and wherein the fourth pixels and the fifth pixels are disposed in a first pattern.

In accordance with an embodiment of the present disclosure, an image sensing system may include: a first sub-pixel array having an arrangement of 4×4 pixels, wherein the first sub-pixel array may include: first to fourth pixels each having a green filter and disposed in a first diagonal direction; fifth and sixth pixels each having a red filter and disposed in a second diagonal direction; seventh and eighth pixels each having a blue filter and disposed in the second diagonal direction; ninth and $10^{th}$ pixels each having a white filter and disposed in a vertical direction; $11^{th}$ and $12^{th}$ pixels each having the white filter and disposed in a horizontal direction; $13^{th}$ and $14^{th}$ pixels suitable for measuring depth information and disposed in the horizontal direction; and $15^{th}$ and $16^{th}$ pixels suitable for measuring the depth information and disposed in the vertical direction.

In accordance with an embodiment of the present disclosure, an image sensing system may include: a first sub-pixel array having an arrangement of 4×4 pixels, wherein the first sub-pixel array may include: first to fourth pixels each having a green filter and disposed in a first diagonal direction; fifth and sixth pixels each having a red filter and disposed in a second diagonal direction; seventh and eighth pixels each having a blue filter and disposed in the second diagonal direction; ninth and $10^{th}$ pixels each having a white filter and disposed in a vertical direction; $11^{th}$ and $12^{th}$ pixels each having the white filter and disposed in a horizontal direction; $13^{th}$ and $14^{th}$ pixels each having the white filter and disposed in the vertical direction; and $15^{th}$ and $16^{th}$ pixels suitable for measuring depth information and disposed in the horizontal direction.

In accordance with an embodiment of the present disclosure, an image sensing system may include: an array of K×K pixels, where K is greater than 4, the array may include: at least a first pixel having a green filter for generating first image signals corresponding to a Bayer pattern; a group of second and third pixels respectively having red and blue filters for generating the first image signals; at least a fourth pixel having a white filter for generating any of the first image signals and second image signals corresponding to a monochrome pattern; and at least a fifth pixel as a phase detection pixel for generating any of the first and second image signals, wherein: the first pixel and the group are arranged in respective diagonal directions, and each of the fourth and fifth pixels is arranged in at least one of horizontal and vertical directions.

BRIEF DESCRIPTION OF THE DRAWINGS

FIG. 3 is a set of diagrams illustrating an example of new patterns of a sub-pixel array illustrated in FIG. 2 with their corresponding Bayer pattern in accordance with an embodiment of the present disclosure.

FIG. 4 is an expanded diagram illustrating an example of the pixel array illustrated in FIG. 1, according to FIGS. 2 and 3 in accordance with an embodiment of the present disclosure.

FIG. 5 is a diagram illustrating another example of new patterns of the sub-pixel array illustrated in FIG. 2 with their corresponding Bayer pattern in accordance with an embodiment of the present disclosure.

FIG. 6 is an expanded diagram illustrating another example of the pixel array illustrated in FIG. 1, according to FIGS. 2 and 5 in accordance with an embodiment of the present disclosure.

FIGS. 9 and 10 are diagrams illustrating an example of a kernel of a second corrector illustrated in FIG. 8 in accordance with an embodiment of the present disclosure.

FIG. 11 is a diagram illustrating another example of the kernel of the second corrector illustrated in FIG. 8 in accordance with an embodiment of the present disclosure.

DETAILED DESCRIPTION

Various embodiments of the present disclosure are described below with reference to the accompanying drawings, in order to describe in detail the embodiments so that those with ordinary skill in art to which the present disclosure pertains may easily carry out the technical spirit of the present disclosure.

It will be understood that when an element is referred to as being "connected to" or "coupled to" another element, the element may be directly connected to or coupled to the another element, or electrically connected to or coupled to the another element with one or more elements interposed therebetween. In addition, it will also be understood that the terms "comprises," "comprising," "includes," and "including" when used in this specification do not preclude the presence of one or more other elements, but may further include or have the one or more other elements, unless specifically mentioned to the contrary. In the description throughout the specification, some components are described in singular forms, but the present disclosure is not limited thereto, and it will be understood that the components may be formed in plural.

Figure 1:
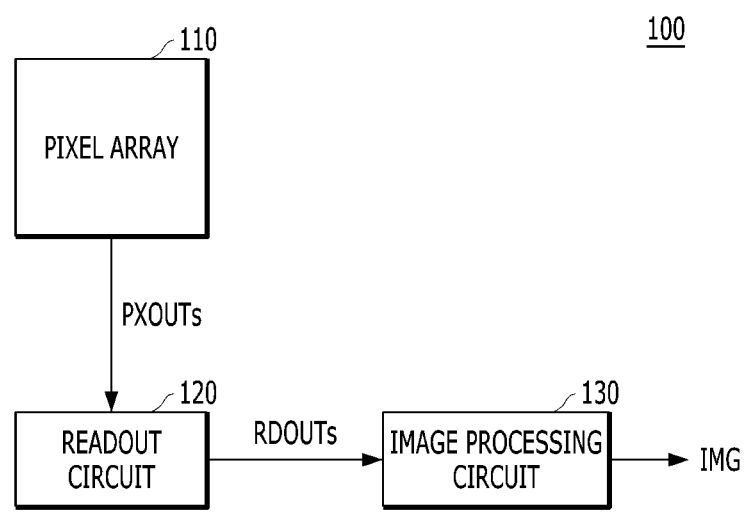
FIG. 1 is a block diagram illustrating an image sensing system in accordance with an embodiment of the present disclosure.

FIG. 1 is a block diagram illustrating an image sensing system 100 in accordance with an embodiment of the present disclosure.

Referring to FIG. 1, the image sensing system 100 may include a pixel array 110, a readout circuit 120 and an image processing circuit 130.

The pixel array 110 may generate pixel signals PXOUTs corresponding to a captured image. Each of the pixel signals PXOUTs may be an analog signal.

The readout circuit 120 may generate image signals RDOUTs on the basis of the pixel signals PXOUTs. Each of the image signals RDOUTs may be a digital signal.

The image processing circuit 130 may generate an image IMG corresponding to the captured image, on the basis of the image signals RDOUTs. The image IMG may have a pattern different from a color filter pattern of the pixel array 110. The color filter pattern may have new patterns different from a Bayer pattern, for example, first to third new patterns NP1, NP2 and NP3 or fourth and fifth new patterns NP4 and NP5, and the image IMG may have the Bayer pattern or a monochrome pattern. The new patterns are described in detail below.

Figure 2:
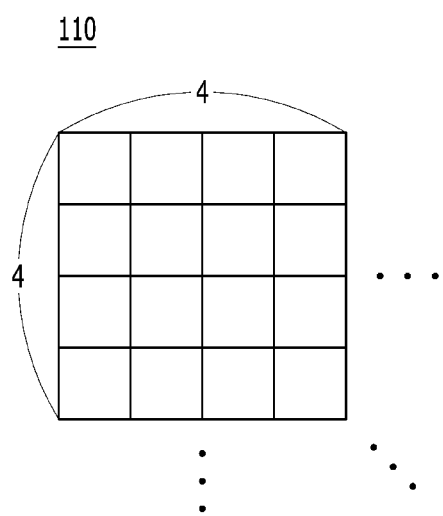
FIG. 2 is a diagram illustrating a pixel array illustrated in FIG. 1.

FIG. 2 is a diagram illustrating the pixel array 110 illustrated in FIG. 1 in accordance with an embodiment of the present disclosure.

Referring to FIG. 2, the pixel array 110 may include M×N pixels arranged at intersections of M rows and N columns, where N and M are natural numbers greater than 2. The pixel array 110 may include a plurality of sub-pixel arrays each having a 4×4 pixel array. That is, each of the plurality of sub-pixel arrays may include 16 pixels. Each of the plurality of sub-pixel arrays may have one of the new patterns (refer to FIGS. 3 and 5). The new patterns may each substantially refer to the color filter pattern of a color filter array included in the pixel array 110.

FIG. 3 is a set of diagrams illustrating an example of the new patterns of the plurality of sub-pixel arrays illustrated in FIG. 2 with their corresponding Bayer pattern in accordance with an embodiment of the present disclosure. In FIG. 3, the new patterns may include the first to third new patterns NP1, NP2 and NP3. Generally, the Bayer pattern may have a pattern in which 2×2 unit pixels are repeated, and is illustrated in units of 4×4 pixels corresponding to the first to third new patterns NP1, NP2 and NP3.

Referring to FIG. 3, in the Bayer pattern in units of 2×2 pixels, pixels each having a green filter G may be disposed in a first diagonal direction descending from left to right, and a pixel having a blue filter B and a pixel having a red filter R may be repeatedly disposed in a second diagonal direction ascending from left to right.

The first new pattern NP1 may be arranged in correspondence with the Bayer pattern as follows. The first new pattern NP1 may include first to fourth pixels disposed in the first diagonal direction and each having a green filter G, fifth and sixth pixels disposed in the second diagonal direction and each having a blue filter B, and seventh and eighth pixels disposed in the second diagonal direction and each having a red filter R. In addition, the first new pattern NP1 may include ninth to $12^{th}$ pixels each having a white filter W and disposed at the other positions except for the arrangement positions of the first to eighth pixels disposed in the first and second diagonal directions, and $13^{th}$ to $16^{th}$ pixels suitable for measuring depth information. The ninth to $12^{th}$ pixels and the $13^{th}$ to $16^{th}$ pixels may be disposed in a first pattern. The ninth and $10^{th}$ pixels may be disposed in a vertical direction and each have the white filter W, and the $11^{th}$ and $12^{th}$ pixels may be disposed in a horizontal direction and each have the white filter W. The ninth and $10^{th}$ pixels may be disposed on one side, e.g., the right, of the first new pattern NP1 in the horizontal direction, and the $11^{th}$ and $12^{th}$ pixels may be disposed on another side, e.g., the bottom, of the first new pattern NP1 in the vertical direction. The $13^{th}$ and $14^{th}$ pixels may measure the depth information and be disposed in the horizontal direction, and the $15^{th}$ and $16^{th}$ pixels may measure the depth information and be disposed in the vertical direction. The $13^{th}$ and $14^{th}$ pixels may be disposed on another side, e.g., the top, of the first new pattern NP1 in the vertical direction, and the $15^{th}$ and $16^{th}$ pixels may be disposed on the other side, e.g., the left, of the first new pattern NP1 in the horizontal direction. Each of the $13^{th}$ to $16^{th}$ pixels may be a phase detection pixel PD. Each of the $13^{th}$ to $16^{th}$ pixels may have a white filter having high sensitivity and low X-talk. According to an embodiment, at least one of the $13^{th}$ to $16^{th}$ pixels may be half-shielded.

The second new pattern NP2 may be arranged in correspondence with the Bayer pattern as follows. The second new pattern NP2 may include first to fourth pixels disposed in the first diagonal direction and each having a green filter G, fifth and sixth pixels disposed in the second diagonal direction and each having a blue filter B, and seventh and eighth pixels disposed in the second diagonal direction and each having a red filter R. In addition, the second new pattern NP2 may include ninth to $12^{th}$ pixels each having a white filter W and disposed at the other positions except for the arrangement positions of the first to eighth pixels disposed in the first and second diagonal directions, and $13^{th}$ to $16^{th}$ pixels suitable for measuring the depth information. The ninth to $12^{th}$ pixels and the $13^{th}$ to $16^{th}$ pixels may be disposed in a second pattern different from the first pattern. The ninth and $10^{th}$ pixels may be disposed in a vertical direction and each have the white filter W, and the $11^{th}$ and $12^{th}$ pixels may be disposed in a horizontal direction and each have the white filter W. The ninth and $10^{th}$ pixels may be disposed on one side, e.g., the left, of the second new pattern NP2 in the horizontal direction, and the $11^{th}$ and $12^{th}$ pixels may be disposed on another side, e.g., the top, of the second new pattern NP2 in the vertical direction. The $13^{th}$ and $14^{th}$ pixels may measure the depth information and be disposed in the horizontal direction, and the $15^{th}$ and $16^{th}$ pixels may measure the depth information and be disposed in the vertical direction. The $13^{th}$ and $14^{th}$ pixels may be disposed on another side, e.g., the bottom, of the second new pattern NP2 in the vertical direction, and the $15^{th}$ and $16^{th}$ pixels may be disposed on the other side, e.g., the right, of the second new pattern NP2 in the horizontal direction. Each of the $13^{th}$ to $16^{th}$ pixels may be a phase detection pixel PD. Each of the $13^{th}$ to $16^{th}$ pixels may have a white filter having high sensitivity and low X-talk. According to an embodiment, at least one of the $13^{th}$ to $16^{th}$ pixels may be half-shielded.

The third new pattern NP3 may be arranged in correspondence with the Bayer pattern as follows. The third new pattern NP3 may include first to fourth pixels disposed in the first diagonal direction and each having a green filter G, fifth and sixth pixels disposed in the second diagonal direction and each having a blue filter B, and seventh and eighth pixels disposed in the second diagonal direction and each having a red filter R. In addition, the third new pattern NP3 may include ninth and $10^{th}$ pixels disposed in the vertical direction on one side, e.g., the right, of the third new pattern NP3 in the horizontal direction and each having a white filter W, $11^{th}$ and $12^{th}$ pixels disposed in the horizontal direction on another side, e.g., the bottom, of the third new pattern NP3 in the vertical direction and each having the white filter W, $13^{th}$ and $14^{th}$ pixels disposed in the vertical direction on another side, e.g., the left, of the third new pattern NP3 in the horizontal direction and each having the white filter W, and $15^{th}$ and $16^{th}$ pixels disposed in the horizontal direction on the other side, e.g., the top, of the third new pattern NP3 in the vertical direction and each having the white filter W.

Figure 4:
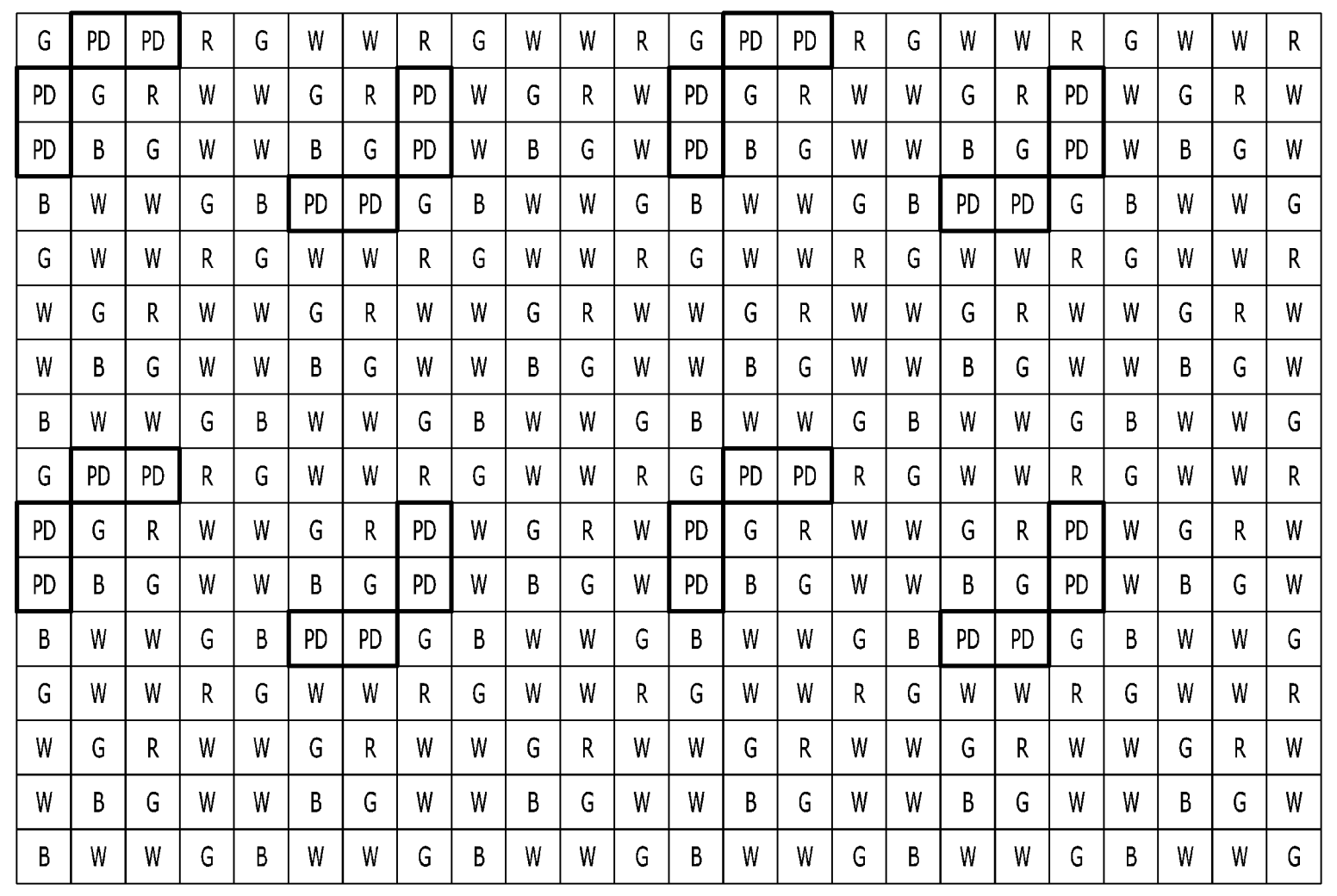

FIG. 4 is an expanded diagram illustrating an example of the pixel array 110 illustrated in FIG. 1, according to FIGS. 2 and 3 in accordance with an embodiment of the present disclosure.

Referring to FIG. 4, the pixel array 110 may have a pattern in which the first to third new patterns NP1, NP2 and NP3 are mixed. For example, the first new pattern NP1, the second new pattern NP2 and the third new pattern NP3 may be repeatedly arranged in first to fourth rows of the pixel array 110, and only the third new pattern NP3 may be repeatedly arranged in fifth to eighth rows of the pixel array 110.

FIG. 5 is a set of diagrams illustrating another example of the new patterns of the plurality of sub-pixel arrays illustrated in FIG. 2 with their corresponding Bayer pattern. In FIG. 5, the new patterns may include the fourth and fifth new patterns NP4 and NP5. Generally, the Bayer pattern may have a pattern in which 2×2 unit pixels are repeated, and is illustrated in units of 4×4 pixels corresponding to the fourth and fifth new patterns NP4 and NP5.

Referring to FIG. 5, in the Bayer pattern in units of 2×2 pixels, pixels each having a green filter G may be disposed in a first diagonal direction descending from left to right, and a pixel having a blue filter B and a pixel having a red filter R may be repeatedly disposed in a second diagonal direction ascending from left to right.

The fourth new pattern NP4 may be arranged in correspondence with the Bayer pattern as follows. The fourth new pattern NP4 may include first to fourth pixels disposed in the first diagonal direction and each having a green filter G, fifth and sixth pixels disposed in the second diagonal direction and each having a blue filter B, and seventh and eighth pixels disposed in the second diagonal direction and each having a red filter R. In addition, the fourth new pattern NP4 may include ninth to $14^{th}$ pixels each having a white filter W and disposed at the other positions except for the arrangement positions of the first to eighth pixels disposed in the first and second diagonal directions, and $15^{th}$ and $16^{th}$ pixels suitable for measuring depth information. The ninth to $14^{th}$ pixels and the $15^{th}$ and $16^{th}$ pixels may be disposed in a first pattern. The ninth and $10^{th}$ pixels may be disposed in a vertical direction and each have the white filter W, the $11^{th}$ and $12^{th}$ pixels may be disposed in a horizontal direction and each have the white filter W, and the $13^{th}$ and $14^{th}$ pixels may be disposed in the vertical direction and each have the white filter W. The ninth and $10^{th}$ pixels may be disposed on one side, e.g., the right, of the fourth new pattern NP4 in the horizontal direction, the $11^{th}$ and $12^{th}$ pixels may be disposed on another side, e.g., the bottom, of the fourth new pattern NP4 in the vertical direction, and the $13^{th}$ and $14^{th}$ pixels may be disposed on another side, e.g., the left, of the fourth new pattern NP4 in the horizontal direction. The $15^{th}$ and $16^{th}$ pixels may measure the depth information and be disposed in the horizontal direction. The $15^{th}$ and $16^{th}$ pixels may be disposed on the other side, e.g., the top, of the fourth new pattern NP4 in the vertical direction. Each of the $15^{th}$ and $16^{th}$ pixels may be a phase detection pixel PD. Each of the $15^{th}$ and $16^{th}$ pixels may have a white filter having high sensitivity and low X-talk. According to an embodiment, at least one of the $15^{th}$ and $16^{th}$ pixels may be half-shielded.

The fifth new pattern NP5 may be arranged in correspondence with the Bayer pattern as follows. The fifth new pattern NP5 may include first to fourth pixels disposed in the first diagonal direction and each having a green filter G, fifth and sixth pixels disposed in the second diagonal direction and each having a blue filter B, and seventh and eighth pixels disposed in the second diagonal direction and each having a red filter R. In addition, the fifth new pattern NP5 may include ninth to $14^{th}$ pixels each having a white filter W and disposed at the other positions except for the arrangement positions of the first to eighth pixels disposed in the first and second diagonal directions, and $15^{th}$ and $16^{th}$ pixels suitable for measuring the depth information. The ninth to $14^{th}$ pixels and the $15^{th}$ and $16^{th}$ pixels may be disposed in a second pattern different from the first pattern. The ninth and $10^{th}$ pixels may be disposed in the horizontal direction and each have the white filter W, the $11^{th}$ and $12^{th}$ pixels may be disposed in the vertical direction and each have the white filter W, and the $13^{th}$ and $14^{th}$ pixels may be disposed in the vertical direction and each have the white filter W. The ninth and $10^{th}$ pixels may be disposed on one side, e.g., the top, of the fifth new pattern NP5 in the vertical direction, the $11^{th}$ and $12^{th}$ pixels may be disposed on another side, e.g., the right, of the fifth new pattern NP5 in the horizontal direction, and the 13$^{th}$ and 14$^{th}$ pixels may be disposed on another side, e.g., the left, of the fifth new pattern NP5 in the horizontal direction. The 15$^{th}$ and 16$^{th}$ pixels may measure the depth information and be disposed in the horizontal direction. The 15$^{th}$ and 16$^{th}$ pixels may be disposed on the other side, e.g., the bottom, of the fifth new pattern NP5 in the vertical direction. Each of the 15$^{th}$ and 16$^{th}$ pixels may be a phase detection pixel PD. Each of the 15$^{th}$ and 16$^{th}$ pixels may have a white filter having high sensitivity and low X-talk. According to an embodiment, at least one of the 15$^{th}$ and 16$^{th}$ pixels may be half-shielded.

Although it is described in the embodiment as an example that another example of the new patterns includes the fourth and fifth new patterns NP4 and NP5, the present disclosure is not necessarily limited thereto, and the new patterns may include the third to fifth new patterns NP3, NP4 and NP5 according to density, i.e., a ratio, or arrangement positions of the phase detection pixels in the M×N pixels included in the pixel array 110. Herein, the third new pattern NP3 has been illustrated in FIG. 3.

Figure 6:
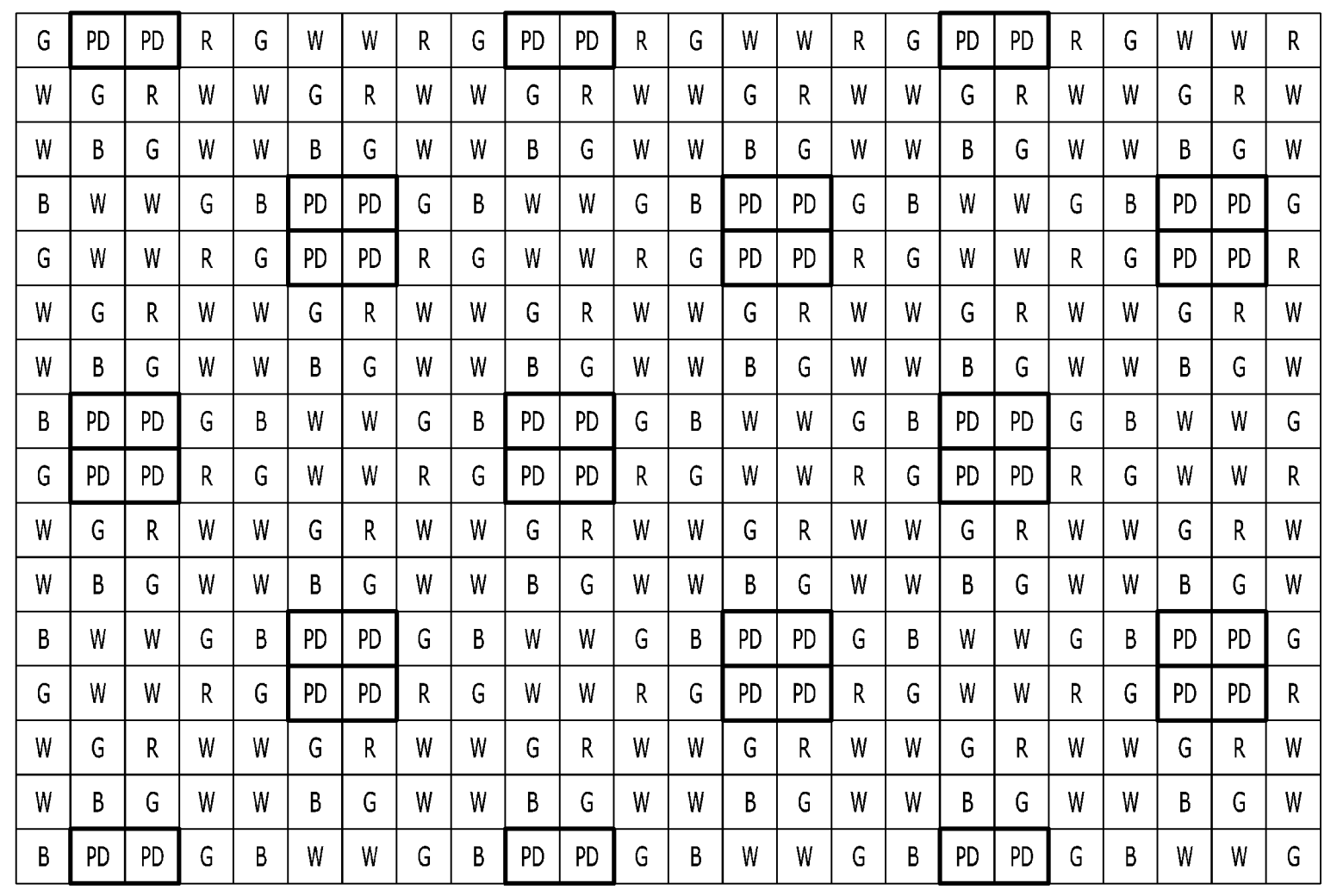

FIG. 6 is an expanded diagram illustrating another example of the pixel array 110 illustrated in FIG. 1, according to FIGS. 2 and 5 in accordance with an embodiment of the present disclosure.

Referring to FIG. 6, the pixel array 110 may have a pattern in which the fourth and fifth new patterns NP4 and NP5 are mixed. For example, the fourth new pattern NP4 and the fifth new pattern NP5 may be repeatedly arranged in first to fourth rows of the pixel array 110, and the fifth new pattern NP5 and the fourth new pattern NP4 may be repeatedly arranged in fifth to eighth rows of the pixel array 110. The fourth new pattern NP4 and the fifth new pattern NP5 may be arranged in a first order (NP4→NP5) in the first to fourth rows of the pixel array 110, and the fifth new pattern NP5 and the fourth new pattern NP4 may be arranged in a second order (NP5→NP4), which is opposite to the first order, in the fifth to eighth rows of the pixel array 110.

Figure 7:
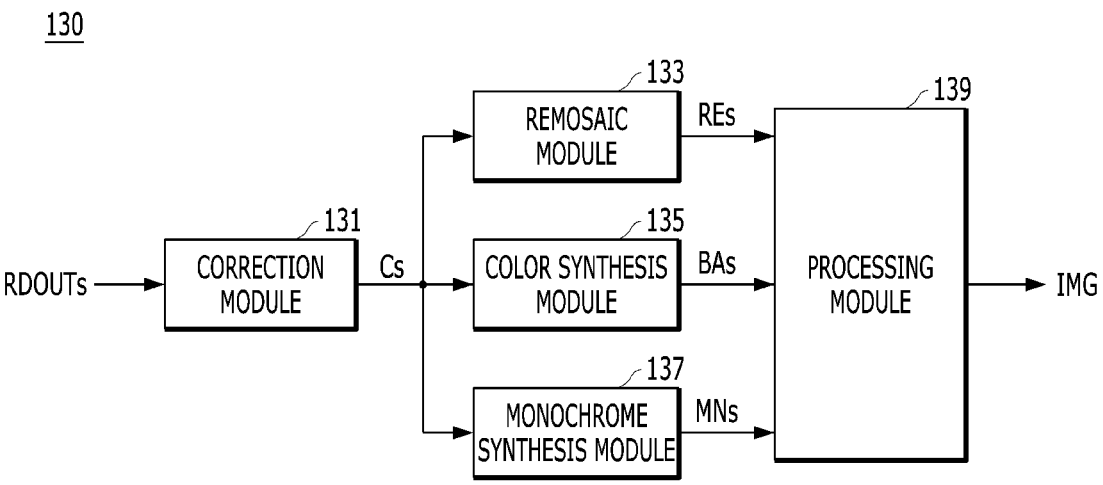
FIG. 7 is a block diagram illustrating an image processing circuit illustrated in FIG. 1 in accordance with an embodiment of the present disclosure.

FIG. 7 is a block diagram illustrating the image processing circuit 130 illustrated in FIG. 1 in accordance with an embodiment of the present disclosure.

Referring to FIG. 7, the image processing circuit 130 may include a correction module 131, a remosaic module 133, a color synthesis module 135, a monochrome synthesis module 137 and a processing module 139.

The correction module 131 may correct each of image signals of the phase detection pixels among the image signals RDOUTs on the basis of at least one correction algorithm, and generate corrected image signals Cs corresponding to the image signals RDOUTs. For example, the correction module 131 may first correct each of the image signals of the phase detection pixels on the basis of a first correction algorithm, and second correct each of the image signals of the phase detection pixels on the basis of a second correction algorithm.

The remosaic module 133 may generate remosaic signals REs corresponding to the Bayer pattern, on the basis of the corrected image signals Cs. The scale, i.e., resolution, of the remosaic signals REs and the scale, i.e., M×N, of the pixel array 110 may be the same as each other. The remosaic module 133 may be enabled in a remosaic operation mode. The remosaic operation mode may be performed in a high-contrast mode and a low-contrast mode, but it may be more advantageous that the remosaic operation mode is performed in the high-contrast mode.

The color synthesis module 135 may generate color synthesis signals BAs corresponding to the Bayer pattern, on the basis of the corrected image signals Cs. The scale, i.e., resolution, of the color synthesis signals BAs may be a quarter (¼) of the scale, i.e., M×N, of the pixel array 110. The color synthesis module 135 may be enabled in a color synthesis operation mode. The color synthesis operation mode may be performed in a high-contrast mode and a low-contrast mode, but it may be more advantageous that the color synthesis operation mode is performed in the low-contrast mode.

The monochrome synthesis module 137 may generate monochrome synthesis signals MNs corresponding to the monochrome pattern, on the basis of the corrected image signals Cs. The scale, i.e., resolution, of the monochrome synthesis signals MNs may be a quarter (¼) of the scale, i.e., M×N, of the pixel array 110. The monochrome synthesis module 137 may be enabled in a monochrome synthesis operation mode. The monochrome synthesis operation mode may be performed in a high-contrast mode and a low-contrast mode.

The processing module 139 may generate the image IMG on the basis of any one signals of the remosaic signals REs, the color synthesis signals BAs and the monochrome synthesis signals MNs. For example, the processing module 139 may generate the image IMG on the basis of the remosaic signals REs in the remosaic operation mode, generate the image IMG on the basis of the color synthesis signals BAs in the color synthesis operation mode, and generate the image IMG on the basis of the monochrome synthesis signals MNs in the monochrome synthesis operation mode.

Figure 8:
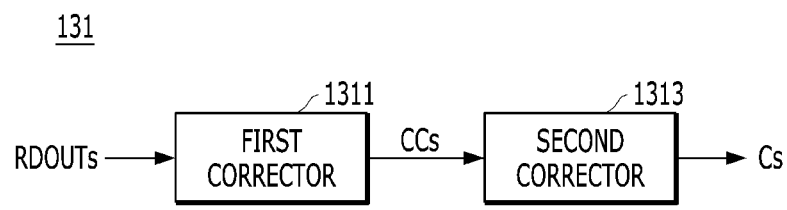
FIG. 8 is a block diagram illustrating a correction module illustrated in FIG. 7 in accordance with an embodiment of the present disclosure.

FIG. 8 is a block diagram illustrating the correction module 131 illustrated in FIG. 7 in accordance with an embodiment of the present disclosure.

Referring to FIG. 8, the correction module 131 may include a first corrector 1311 and a second corrector 1313.

The first corrector 1311 may correct each of the image signals of the phase detection pixels by using a previously stored correction table without using a kernel, according to the first correction algorithm. For example, the correction table may include a plurality of gain values corresponding to a plurality of regions of the pixel array 110. Each of the plurality of gain values may be calculated based on an average value of the image signals corresponding to the phase detection pixels and an average value of image signals corresponding to pixels each having a white filter in each of the plurality of regions. Since the first correction algorithm using the previously stored correction table without using the kernel is publicly known and commonly used art, more detailed descriptions thereof are omitted.

The second corrector 1313 may correct each of the image signals of the phase detection pixels by using at least one kernel, on the basis of the second correction algorithm. The at least one kernel may be determined to include at least one pixel having a white filter in a horizontal direction, a vertical direction and a diagonal direction with respect to each of the phase detection pixels (refer to FIGS. 9 to 11). For example, the second corrector 1313 may correct an image signal of a target phase detection pixel on the basis of an image signal corresponding to at least one pixel unrelated to an edge among first and second pixels adjacent to the vertical direction, that is, upward and downward directions, of the target phase detection pixel, third and fourth pixels adjacent to the horizontal direction, that is, right and left directions, of the target phase detection pixel, and fifth to eighth pixels adjacent to the diagonal direction, that is, top-left, top-right, bottom-right and bottom-left directions, of the target phase detection pixel. Since the second correction algorithm using the kernel is publicly known and commonly used art, more detailed descriptions thereof are omitted.

FIGS. 9 and 10 are diagrams illustrating an example of the kernel of the second corrector 1313 illustrated in FIG. 8. For example, FIGS. 9 and 10 are diagrams according to the first new pattern NP1 illustrated in FIG. 4.

Referring to FIG. 9, in order to correct the $13^{th}$ and $14^{th}$ pixels disposed in the horizontal direction among the phase detection pixels, the kernel may have a size of 8×6. The kernel having the size of 8×6 may include at least one pixel having a white filter W in all directions, that is, the horizontal direction, the vertical direction and the diagonal direction, with respect to the $13^{th}$ and $14^{th}$ pixels.

Referring to FIG. 10, in order to correct the $15^{th}$ and $16^{th}$ pixels disposed in the vertical direction among the phase detection pixels, the kernel may have a size of 6×8. The kernel having the size of 6×8 may include at least one pixel having a white filter W in all directions, that is, the horizontal direction, the vertical direction and the diagonal direction, with respect to the $15^{th}$ and $16^{th}$ pixels.

FIG. 11 is a diagram illustrating another example of the kernel of the second corrector 1313 illustrated in FIG. 8 in accordance with an embodiment of the present disclosure. For example, FIG. 11 is a diagram according to the fourth and fifth new patterns NP4 and NP5 illustrated in FIG. 6.

Referring to FIG. 11, in order to correct the phase detection pixels, the kernel may have a size of 8×8. The kernel having the size of 8×8 may include at least one pixel having a white filter W in all directions, that is, a horizontal direction, a vertical direction and a diagonal direction, with respect to the phase detection pixels.

Hereinafter, an operation of the image sensing system 100 in accordance with an embodiment, which has the above-described configuration, is described with reference to FIGS. 12 to 14.

Figure 12:
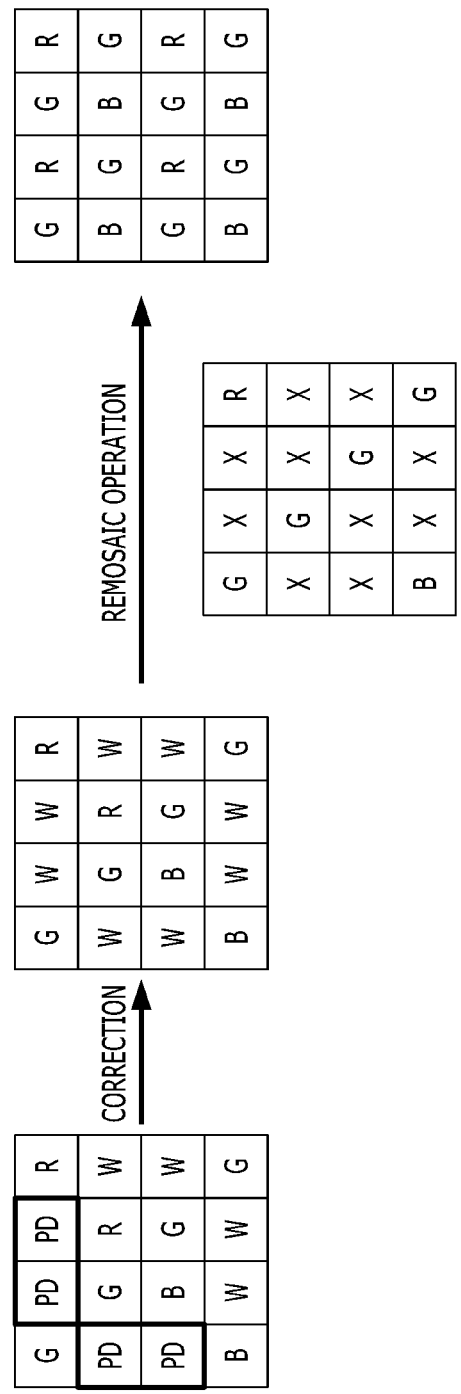
FIG. 12 is a diagram illustrating a remosaic operation according to a remosaic operation mode among the operations of the image sensing system illustrated in FIG. 1 in accordance with an embodiment of the present disclosure.

FIG. 12 is a diagram illustrating the remosaic operation according to the remosaic operation mode among the operations of the image sensing system 100 illustrated in FIG. 1 in accordance with an embodiment of the present disclosure. It should be noted that only one target sub-pixel array of the pixel array 110 is illustrated in FIG. 12, and it is described as an example that the target sub-pixel array has the first new pattern NP1 illustrated in FIG. 3.

Referring to FIG. 12, the correction module 131 may correct image signals corresponding to phase detection pixels among image signals ROUTs corresponding to the target sub-pixel array. For example, the correction module 131 may perform a first correction on the phase detection pixels on the basis of a previously stored correction table, and perform a second correction on the phase detection pixels through interpolation using a predetermined kernel. The image signals corresponding to the phase detection pixels may be corrected as image signals corresponding to pixels each having a white filter W.

The remosaic module 133 may convert the corrected image signals Cs outputted from the correction module 131 into the remosaic signals REs corresponding to the Bayer pattern. For example, the remosaic module 133 may convert image signals (marked with "X" in FIG. 12), which are different from the Bayer pattern among the corrected image signals Cs, through interpolation. The scale, i.e., resolution, of the remosaic signals REs and the scale of the image signals ROUTs corresponding to the target sub-pixel array may be the same as each other. Since the remosaic operation of the remosaic module 133 is publicly known and commonly used art, more detailed descriptions thereof are omitted.

Figure 13:
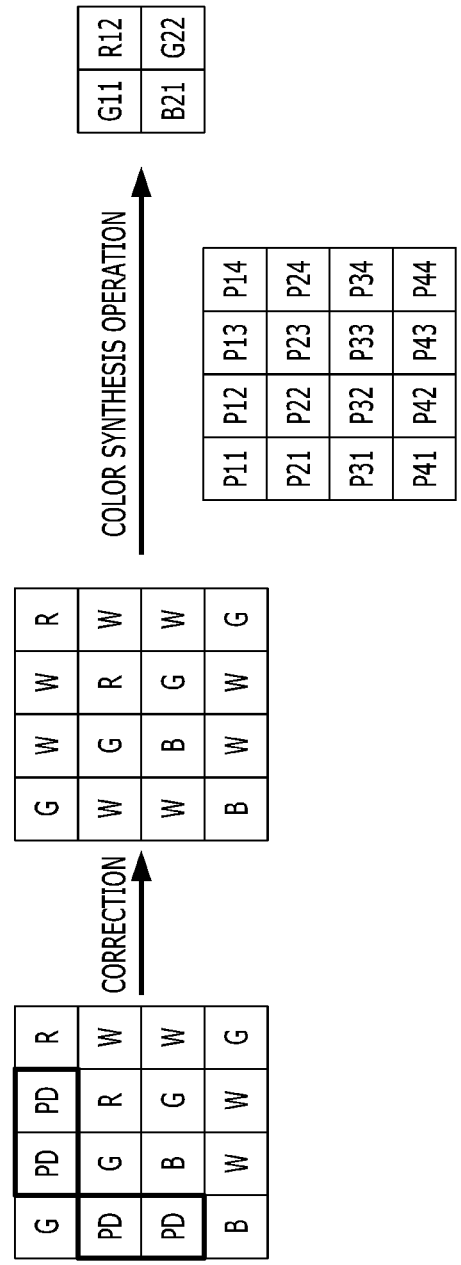
FIG. 13 is a diagram illustrating a color synthesis operation according to a color synthesis operation mode among the operations of the image sensing system illustrated in FIG. 1 in accordance with an embodiment of the present disclosure.

FIG. 13 is a diagram illustrating the color synthesis operation according to the color synthesis operation mode among the operations of the image sensing system 100 illustrated in FIG. 1 in accordance with an embodiment of the present disclosure. It should be noted that only one target sub-pixel array of the pixel array 110 is illustrated in FIG. 13, and it is described as an example that the target sub-pixel array has the first new pattern NP1 illustrated in FIG. 3.

Referring to FIG. 13, the correction module 131 may correct image signals corresponding to phase detection pixels among image signals ROUTs corresponding to the target sub-pixel array. For example, the correction module 131 may perform first correction on the phase detection pixels on the basis of a previously stored correction table, and perform second correction on the phase detection pixels through interpolation using a predetermined kernel. The image signals corresponding to the phase detection pixels may be corrected as image signals corresponding to pixels each having a white filter W.

The color synthesis module 135 may convert the corrected image signals Cs outputted from the correction module 131 into the color synthesis signals BAs corresponding to the Bayer pattern. For example, the color synthesis module 135 may generate a first color synthesis signal G11 by synthesizing first image signals P11, P12, P21 and P22 corresponding to a first array region among the corrected image signals Cs, generate a second color synthesis signal G22 by synthesizing second image signals P33, P34, P43 and P44 corresponding to a second array region among the corrected image signals Cs, generate a third color synthesis signal R12 by synthesizing third image signals P13, P14, P23 and P24 corresponding to a third array region among the corrected image signals Cs, and generate a fourth color synthesis signal B21 by synthesizing fourth image signals P31, P32, P41 and P42 corresponding to a fourth array region among the corrected image signals Cs. For example, the first color synthesis signal G11 may be calculated by Equation 1 below, the second color synthesis signal G22 may be calculated by Equation 2 below, and the third color synthesis signal R12 may be calculated by Equation 3 below, and the fourth color synthesis signal B21 may be calculated by Equation 4 below.

$$G11 = (P11 + P22) \times \frac{0.5(P12 + P21)}{\sum_{i,j \in ROI} W_{i,j}} \quad \text{[Equation 1]}$$

$$G22 = (P33 + P44) \times \frac{0.5(P34 + P43)}{\sum_{i,j \in ROI} W_{i,j}} \quad \text{[Equation 2]}$$

$$R12 = (P14 + P23) \times \frac{0.5(P13 + P24)}{\sum_{i,j \in ROI} W_{i,j}} \quad \text{[Equation 3]}$$

$$B21 = (P32 + P41) \times \frac{0.5(P31 + P42)}{\sum_{i,j \in ROI} W_{i,j}} \quad \text{[Equation 4]}$$

Herein, "$\sum_{i,j \in ROI} W_{i,j}$" denotes an average value of readout signals, which correspond to the pixels each having the white filter W, in a region of interest that is set with respect to each of the array regions.

The readout signals of the pixels each having the white filter W are applied to the first color synthesis signal G11, the second color synthesis signal G22, the third color synthesis signal R12 and the fourth color synthesis signal B21, thereby improving a signal-to-noise ratio (SNR).

Figure 14:
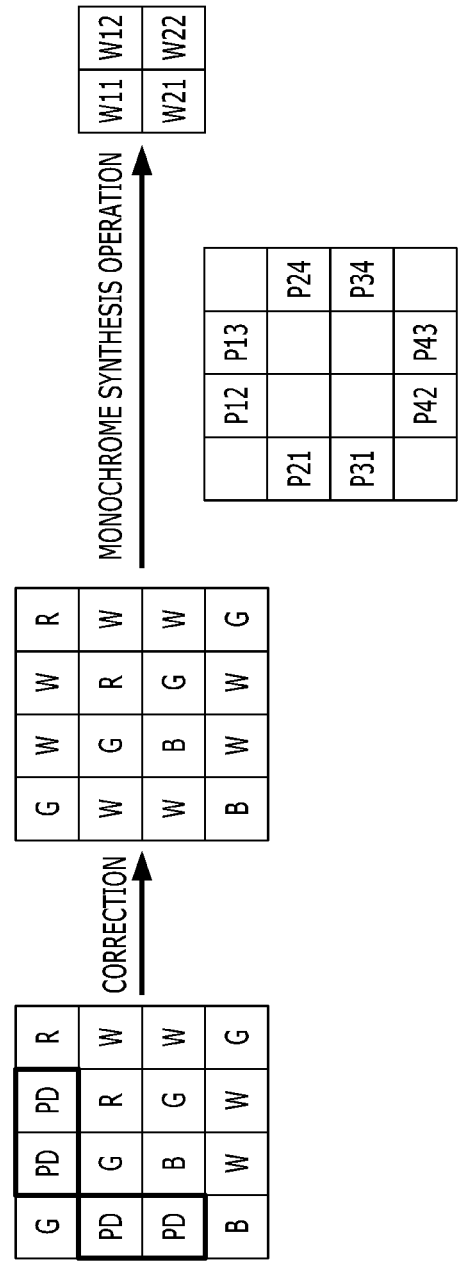
FIG. 14 is a diagram illustrating a monochrome synthesis operation according to a monochrome synthesis operation mode among the operations of the image sensing system illustrated in FIG. 1 in accordance with an embodiment of the present disclosure.

FIG. 14 is a diagram illustrating the monochrome synthesis operation according to the monochrome synthesis operation mode among the operations of the image sensing system 100 illustrated in FIG. 1 in accordance with an embodiment of the present disclosure. It should be noted that only one target sub-pixel array of the pixel array 110 is illustrated in FIG. 14, and it is described as an example that the target sub-pixel array has the first new pattern NP1 illustrated in FIG. 3.

Referring to FIG. 14, the correction module 131 may correct image signals corresponding to phase detection pixels among image signals ROUTs corresponding to the target sub-pixel array. For example, the correction module 131 may perform first correction on the phase detection pixels on the basis of a previously stored correction table, and perform second correction on the phase detection pixels through interpolation using a predetermined kernel. The image signals corresponding to the phase detection pixels may be corrected as image signals corresponding to pixels each having a white filter W.

The monochrome synthesis module 137 may convert the corrected image signals Cs outputted from the correction module 131 into the monochrome synthesis signals MNs corresponding to the monochrome pattern. The monochrome synthesis module 137 may generate a first monochrome synthesis signal W11 by synthesizing first image signals P12 and P21 corresponding to the pixels each having the white filter W in a first array region among the corrected image signals Cs, generate a second monochrome synthesis signal W22 by synthesizing second image signals P34 and P43 corresponding to the pixels each having the white filter W in a second array region among the corrected image signals Cs, generate a third monochrome synthesis signal W12 by synthesizing third image signals P13 and P24 corresponding to the pixels each having the white filter W in a third array region among the corrected image signals Cs, and generate a fourth monochrome synthesis signal W21 by synthesizing fourth image signals P31 and P42 corresponding to the pixels each having the white filter W in a fourth array region among the corrected image signals Cs.

According to an embodiment of the present disclosure, a pixel array having a new pattern including phase detection pixels is proposed, which makes it possible to generate an optimal image in a high-contrast mode and a low-contrast mode.

According to an embodiment of the present disclosure, a pattern of a pixel array is newly proposed, which makes it possible to improve a signal-to-noise ratio (SNR) in a low-contrast mode, support a high resolution in a high-contrast mode, provide a monochrome image in the low-contrast and high-contrast modes, and improve accuracy due to high sensitivity when depth information is measured.

While the present disclosure has been illustrated and described with respect to specific embodiments, the disclosed embodiments are provided for the description, and not intended to be restrictive. Further, it is noted that the present disclosure may be achieved in various ways through substitution, change, and modification that fall within the scope of the following claims, as those skilled in the art will recognize in light of the present disclosure. Furthermore, the embodiments may be combined to form additional embodiments.

What is claimed is:

1. An image sensing system comprising:
a first sub-pixel array having an arrangement of K×K pixels, where "K" is a natural number,
wherein the first sub-pixel array includes:
first pixels disposed in a first diagonal direction and each having a green filter;
second pixels disposed in a second diagonal direction that intersects the first diagonal direction and each having a red filter;
third pixels disposed in the second diagonal direction and each having a blue filter;
fourth pixels each having a white filter and disposed at other positions from the first to third pixels disposed in the first and second diagonal directions; and
fifth pixels suitable for measuring depth information and disposed at other positions from the first to third pixels disposed in the first and second diagonal directions, and
wherein the fourth pixels and the fifth pixels are disposed in a first pattern.

2. The image sensing system of claim 1, further comprising a second sub-pixel array having the arrangement of the K×K pixels,
wherein the second sub-pixel array includes:
sixth pixels disposed in the first diagonal direction and each having the green filter;
seventh pixels disposed in the second diagonal direction and each having the red filter;
eighth pixels disposed in the second diagonal direction and each having the blue filter;
ninth pixels each having the white filter and disposed at the other positions except for the arrangement positions of the sixth to eighth pixels disposed in the first and second diagonal directions; and
$10^{th}$ pixels suitable for measuring depth information and disposed at the other positions except for the arrangement positions of the sixth to eighth pixels disposed in the first and second diagonal directions, and
wherein the ninth pixels and the $10^{th}$ pixels are disposed in a second pattern different from the first pattern.

3. The image sensing system of claim 1, further comprising a third sub-pixel array having the arrangement of the K×K pixels,
wherein the third sub-pixel array includes:
$11^{th}$ pixels disposed in the first diagonal direction and each having the green filter;
$12^{th}$ pixels disposed in the second diagonal direction and each having the red filter;
$13^{th}$ pixels disposed in the second diagonal direction and each having the blue filter; and
$14^{th}$ pixels each having the white filter and disposed at the other positions except for the arrangement positions of the $11^{th}$ to $13^{th}$ pixels disposed in the first and second diagonal directions.

4. The image sensing system of claim 1, further comprising:
a correction module suitable for generating, on the basis of at least one correction algorithm, fifth signals corresponding to the fifth pixels; and
a remosaic module suitable for converting first signals corresponding to the first pixels, second signals corresponding to the second pixels, third signals corresponding to the third pixels, fourth signals corresponding to the fourth pixels and the fifth signals corresponding to the fifth pixels into image signals corresponding to a Bayer pattern.

5. The image sensing system of claim 4, further comprising:
a color synthesis module suitable for generating the image signals corresponding to the Bayer pattern by synthesizing the first to fifth signals in units of 2×2; and
a monochrome synthesis module suitable for generating image signals corresponding to a monochrome pattern by synthesizing the fourth and fifth signals according to an arrangement position.

6. The image sensing system of claim 1,
wherein the first sub-pixel array has an arrangement of 4×4 pixels,
wherein the first pixels comprise first to fourth pixels each having the green filter and disposed in the first diagonal direction;
wherein the second pixels comprise fifth and sixth pixels each having the red filter and disposed in the second diagonal direction;
wherein the third pixels comprise seventh and eighth pixels each having the blue filter and disposed in the second diagonal direction;
wherein the fourth pixels comprise
ninth and $10^{th}$ pixels each having the white filter and disposed in a vertical direction, and
$11^{th}$ and $12^{th}$ pixels each having the white filter and disposed in a horizontal direction; and
wherein the fifth pixels comprise
$13^{th}$ and $14^{th}$ pixels suitable for measuring the depth information and disposed in the horizontal direction, and
$15^{th}$ and $16^{th}$ pixels suitable for measuring the depth information and disposed in the vertical direction.

7. The image sensing system of claim 6,
wherein the $13^{th}$ and $14^{th}$ pixels are disposed on one side of the first sub-pixel array in the vertical direction, and
wherein the $15^{th}$ and $16^{th}$ pixels are disposed on one side of the first sub-pixel array in the horizontal direction.

8. The image sensing system of claim 6, further comprising a second sub-pixel array having the arrangement of 4×4 pixels,
wherein the second sub-pixel array includes:
$17^{th}$ to $20^{th}$ pixels each having the green filter and disposed in the first diagonal direction;
$21^{st}$ and $22^{nd}$ pixels each having the red filter and disposed in the second diagonal direction;
$23^{rd}$ and $24^{th}$ pixels each having the blue filter and disposed in the second diagonal direction;
$25^{th}$ and $26^{th}$ pixels each having the white filter and disposed in the vertical direction;
$27^{th}$ and $28^{th}$ pixels each having the white filter and disposed in the horizontal direction;
$29^{th}$ and $30^{th}$ pixels suitable for measuring the depth information and disposed in the horizontal direction; and
$31^{st}$ and $32^{nd}$ pixels suitable for measuring the depth information and disposed in the vertical direction.

9. The image sensing system of claim 8,
wherein the $29^{th}$ and $30^{th}$ pixels are disposed on one side of the second sub-pixel array in the vertical direction, and
wherein the $31^{st}$ and $32^{nd}$ pixels are disposed on one side of the second sub-pixel array in the horizontal direction.

10. The image sensing system of claim 6, further comprising a third sub-pixel array having the arrangement of 4×4 pixels,
wherein the third sub-pixel array includes:
$33^{rd}$ to $36^{th}$ pixels each having the green filter and disposed in the first diagonal direction;
$37^{th}$ and $38^{th}$ pixels each having the red filter and disposed in the second diagonal direction;
$39^{th}$ and $40^{th}$ pixels each having the blue filter and disposed in the second diagonal direction;
$41^{st}$ and $42^{nd}$ pixels each having the white filter and disposed in the vertical direction;
$43^{rd}$ and $44^{th}$ pixels each having the white filter and disposed in the horizontal direction;
$45^{th}$ and $46^{th}$ pixels each having the white filter and disposed in the horizontal direction; and
$47^{th}$ and $48^{th}$ pixels each having the white filter and disposed in the vertical direction.

11. The image sensing system of claim 6, further comprising:
a correction module suitable for generating, on the basis of at least one correction algorithm, $13^{th}$ to $16^{th}$ signals corresponding to the $13^{th}$ to $16^{th}$ pixels; and
a remosaic module suitable for converting first to 12th signals corresponding to the first to $12^{th}$ pixels and $13^{th}$ to $16^{th}$ signals corresponding to the $13^{th}$ to $16^{th}$ pixels into image signals corresponding to a Bayer pattern.

12. The image sensing system of claim 11, further comprising:
a color synthesis module suitable for generating the image signals corresponding to the Bayer pattern by synthesizing the first to $16^{th}$ signals in units of 2×2; and
a monochrome synthesis module suitable for generating image signals corresponding to a monochrome pattern by synthesizing the $9^{th}$ to $16^{th}$ signals according to an arrangement position.

13. The image sensing system of claim 1,
wherein the first sub-pixel array has the arrangement of K×K pixels, where "K" is greater than 4,
wherein the first pixels comprise first to fourth pixels each having the green filter and disposed in the first diagonal direction;
wherein the second pixels comprise fifth and sixth pixels each having the red filter and disposed in the second diagonal direction;
wherein the third pixels comprise seventh and eighth pixels each having the blue filter and disposed in the second diagonal direction;
wherein the fourth pixels comprise
ninth and $10^{th}$ pixels each having the white filter and disposed in a vertical direction,
$11^{th}$ and $12^{th}$ pixels each having the white filter and disposed in a horizontal direction, and;
$13^{th}$ and $14^{th}$ pixels each having the white filter and disposed in the vertical direction, and
wherein the fifth pixels comprise
$15^{th}$ and $16^{th}$ pixels suitable for measuring depth information and disposed in the horizontal direction.

14. The image sensing system of claim 13, wherein the 15th and 16th pixels are disposed on one side of the first sub-pixel array in the vertical direction.

15. The image sensing system of claim 13, further comprising a second sub-pixel array having the arrangement of 4×4 pixels,
wherein the second sub-pixel array includes:
$17^{th}$ to $20^{th}$ pixels each having the green filter and disposed in the first diagonal direction;
$21^{st}$ and $22^{nd}$ pixels each having the red filter and disposed in the second diagonal direction;
$23^{rd}$ and $24^{th}$ pixels each having the blue filter and disposed in the second diagonal direction;

25th and 26th pixels each having the white filter and disposed in the vertical direction;
27th and 28th pixels each having the white filter and disposed in the horizontal direction;
29th and 30th pixels each having the white filter and disposed in the vertical direction; and
31st and 32nd pixels suitable for measuring the depth information and disposed in the horizontal direction.

16. The image sensing system of claim 15, wherein the 31st and 32nd pixels are disposed on one side of the second sub-pixel array in the vertical direction.

17. The image sensing system of claim 13, further comprising a third sub-pixel array having the arrangement of 4×4 pixels,
wherein the third sub-pixel array includes:
33rd to 36th pixels each having the green filter and disposed in the first diagonal direction;
37th and 38th pixels each having the red filter and disposed in the second diagonal direction;
39th and 40th pixels each having the blue filter and disposed in the second diagonal direction;
41st and 42nd pixels each having the white filter and disposed in the vertical direction;
43rd and 44th pixels each having the white filter and disposed in the horizontal direction;
45th and 46th pixels each having the white filter and disposed in the vertical direction; and
47th and 48th pixels each having the white filter and disposed in the horizontal direction.

18. The image sensing system of claim 13, further comprising:
a correction module suitable for generating, on the basis of at least one correction algorithm, 15th and 16th signals corresponding to the 15th and 16th pixels; and
a remosaic module suitable for converting first to 14th signals corresponding to the first to 14th pixels and the 15th and 16th signals corresponding to the 15th and 16th pixels into image signals corresponding to a Bayer pattern.

19. The image sensing system of claim 18, further comprising:
a color synthesis module suitable for generating the image signals corresponding to the Bayer pattern by synthesizing the first to 16th signals in units of 2×2; and
a monochrome synthesis module suitable for generating image signals corresponding to a monochrome pattern by synthesizing the 9th to 16th signals according to an arrangement position.

\* \* \* \* \*